United States Patent
Kim et al.

(10) Patent No.: US 6,891,894 B1
(45) Date of Patent: May 10, 2005

(54) METHOD FOR DECODING AND DISPLAYING DIGITAL BROADCASTING SIGNALS

(75) Inventors: See-Hyun Kim, Kyunggi-Do (KR); Hee-Sub Lee, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 1064 days.

(21) Appl. No.: 09/713,029

(22) Filed: Nov. 16, 2000

(30) Foreign Application Priority Data

Nov. 18, 1999 (KR) .......................................... 1999/51281
Dec. 3, 1999 (KR) .......................................... 1999/54741

(51) Int. Cl.$^7$ ................................................ H04N 7/32
(52) U.S. Cl. .................................. 375/240.26; 348/716
(58) Field of Search .............................. 348/716, 512, 348/513; 375/240.26, 240.2, 240.24, 240.15

(56) References Cited

U.S. PATENT DOCUMENTS 4,757,473 A    7/1988  Kurihara et al.
6,289,053 B1 *  9/2001  Varanasi et al. ....... 375/240.17

FOREIGN PATENT DOCUMENTS

GB          2 257 591        1/1993

* cited by examiner

Primary Examiner—David E. Harvey
(74) Attorney, Agent, or Firm—Fleshner & Kim, LLP

(57) ABSTRACT

The present invention relates to a method for decoding and storing digital broadcasting signals which is capable of freely adjusting size and position of a broadcasting video window by preventing a frame buffer conflict between storing and fetching timing of the decoded data which can be occurred depending on the position and the size of the video window displayed on a screen, without expanding memory or upgrading speed of the decoder.

15 Claims, 6 Drawing Sheets

FIG. 6B

| DISPLAY ORDER | BUFFER MEMORY | ADDR | STORING ORDER OF DECODED DATA |
|---|---|---|---|
| | top_line(0) | 0 | |
| | bot_line(1) | 1 | |
| R7 | top_line($\frac{N}{2}$) | 2 | W4 |
| R9 | bot_line($\frac{N}{2}$+1) | 3 | |
| R8 | top_line(2) | 4 | W5 |
| R10 | bot_line(3) | 5 | |
| | top_line($\frac{N}{2}$+2) | 6 | |
| | bot_line($\frac{N}{2}$+3) | 7 | |
| | ... | ... | |
| | ... | ... | |
| | top_line($\frac{N}{2}$-2) | N-4 | |
| | bot_line($\frac{N}{2}$-1) | N-3 | |
| | top_line(N-2) | N-2 | |
| | bot_line(N-1) | N-1 | |

METHOD FOR DECODING AND DISPLAYING DIGITAL BROADCASTING SIGNALS

BACKGROUND OF THE INVENTION

1. Field of the Invention

The present invention relates to a method for decoding and displaying digital broadcasting signals, in particular to a method for storing the decoded picture for preventing a frame buffer conflict irrespective of location and size of a display window on the screen in decoding and displaying digital broadcasting signals.

2. Description of the Related Art

The digital television (DTV) broadcasting has started in the United States since 1998. Many efforts have been made to develop DTV sets and set-top boxes for receiving the digital television signal. Recently, an interactive set-top box has been presented, which provides communication services based on the web by displaying a small window on the television screen while a user watches a television program.

However, since the DTV set is quite expensive for general customers, there are much attentions on the development of a low price set-top boxes. PC (personal computer) add-in cards would be another economical solution for DTV viewing because a PC platform provides a powerful development environment and user interface. Using a local bus or a video signal interface, for example Video Interface Port (VIP1.1), standard definition (SD) pictures can be transmitted from a DTV reception card to a graphic card. Thus, DTV can be put together with other graphic windows on the monitor.

If the broadcasting videos are HD (High Definition) programs the HD video signals should be outputted to a graphic controller supporting a new video signal interfacing standard such as VIP 2.0. However, it is not easy to transfer the HD video signal to the graphic controller because such a high bandwidth video signal interface such as VIP2.0 is not popular yet and it causes heavy load for a local bus. Therefore, is hard to overlay the HD program within the graphic controller.

Another alternative way to view HD video on the PC monitor is to overlay the video with other graphics in the analog domain. One input of the analog overlay device is the decoded video signal from the DTV reception card and the other input comes from the graphic card with an empty window for DTV video to be displayed. Therefore, user can watch HD programs on a window in the PC monitor.

For digital video broadcasting, Advanced Television System Committee (ATSC) adopts MPEG-2 (Moving Picture Experts Group 2) video compression technology. Using MPEG-2 video compression algorithm, four to six SD programs or one HD program can be transmitted through the channel of the same bandwidth as the National Television System Committee (NTSC) specification.

One technique of MPEG-2 is to exploit a temporal redundancy to compress the video signal. Each frame can be encoded in an intra mode (I-frame), prediction mode (P-frame) or bi-directional prediction mode(B-frame). In order to decode B pictures, it is required to have at least three frame buffers; two for reference frames and one for decoded frame. FIG. 1 is a block diagram illustrating the general coding and display apparatus with three frame buffers. The apparatus might have more than three frame buffers, but it causes the increase of the material cost. For 1920×1080 pictures, one frame buffer amounts to 3.1 Mbytes.

As depicted in FIG. 1, the decoder 1 decodes DTV signals and stores the picture data in the buffer memory 2. And, the data stored in the buffer memory 2 is fetched and displayed by the display device 3.

Since there are two buffers for I or P frame, there is no buffer conflict for decoding and displaying I or P pictures simultaneously. That is, when I or P picture is decoded and displayed concurrently, the picture in one I or P buffer is being displayed, the other will be used for storing new picture.

However, there are more than two pictures in a row, say B1 and B2, one B frame buffer has to take care of both decoding and displaying pictures. In other words, B2 picture data can not be stored before B1 data has been fetched, and the fetching operation for B2 can not be performed until B2 data has been stored.

Herein, a covalent process of the B-frame buffer in the data storing and fetching operation will now be described in detail with reference to the accompanying FIG. 2 and FIG. 3.

First, FIG. 2 illustrates a timing chart for comparing the data storing time and data fetching time when displaying interlaced pictures on a interlace monitor. Also, it is assumed that the size of display window is same as the size of the whole screen.

As depicted in FIG. 2, the decoding and display process are apart by a half frame time. For B pictures, the top field of B1 picture (B1t) is displayed a half frame time after starting to decode the B1 picture, and the B2 picture starts to be decoded when the bottom field of B1 picture (B1b) is displayed.

FIG. 3 is a memory map illustrating the data storing and fetching process for the frame pictures. The top and bottom field data are stored in the order of W1.

When the top field is displayed, the top-field data (top__ line(0)~top__line(N2)) are fetched in the order of R1.R2 denotes the fetch order for displaying the bottom field.

Provided that a picture can be decoded in a frame time, the top field data will be stored before it is displayed and the bottom field data will be fetched before a new picture is stored. Accordingly, when the video is displayed on the whole screen of the monitor, a buffer memory conflict in storing and fetching data does not occur.

However, at a letter box mode of 16:9 pictures on a 4:3 monitor as shown in FIG. 4A, or at an analog overlay mode as shown in FIG. 4B, there is a T-gap or B-gap where videos are not displayed on the upper or lower portion of the screen. As the fetching time for display is shortened, the decoding time is affected.

FIG. 5A is a timing chart for illustrating the decoding and display timing when there is T-gap, i.e., the video is not displayed on the upper portion of the screen. As depicted in FIG. 5A, the decoding process for the second B picture (B2) should be delayed until the bottom field of B1 (B1b) starts to be displayed.

In addition, FIG. 5B is a timing chart for illustrating the decoding and display timing when there is B-gap, i.e., the video is not displayed on the lower portion of the screen. As depicted in FIG. 5B, the decoding process should be completed as early as the scanning time of the B-gap.

Consequently, the decoding process should be controlled so that it would not cause a frame buffer memory conflict described above.

In order to prevent the above mentioned frame buffer conflict, one additional buffer memory can be employed for the B picture or a decoder with higher performance can be integrated. But, it causes increase of the manufacturing cost.

SUMMARY OF THE INVENTION

It is an object of the present invention to provide a method for decoding and storing digital broadcasting signals without an additional buffer memory when there is T-gap where videos are not displayed on the upper portion of a screen.

The other object of the present invention is to provide a method for decoding and storing the digital broadcasting signals which allows the decoder to exploit entire decoding time even with a B-gap where videos are not displayed on the lower portion of the screen.

In order to achieve the above mentioned objects, a method for decoding and storing digital broadcasting signals according to the present invention comprises a process for detecting a non-display section where the videos are not displayed on a display screen, a process for judging whether the non-display section is on the lower portion of the screen, a process for adjusting an edge timing to a display completion timing by shifting a decoding field ID as time as the non-display section when the non-display section is on the lower portion of the screen, and a process for performing the first and the second memory control mode by turns.

BRIEF DESCRIPTION OF THE DRAWINGS

FIG. 6B is a memory map illustrating the second memory control mode of the present invention.

DETAILED DESCRIPTION OF THE PREFERRED EMBODIMENT

Hereinafter, the preferred embodiments of the present invention will now be described in more detail.

Figure 1:
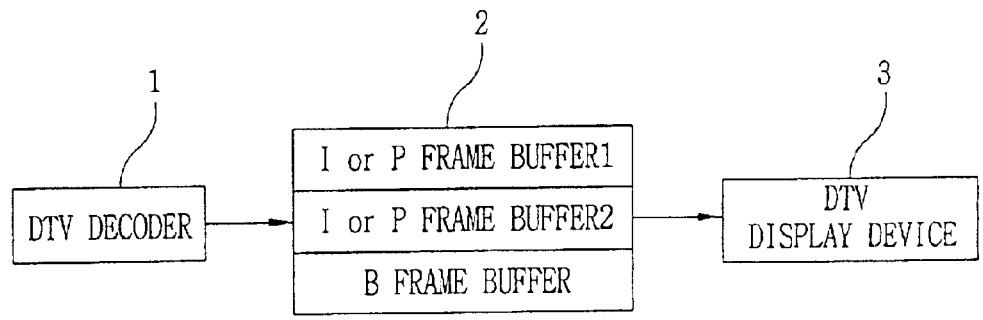
FIG. 1 is a block diagram illustrating the general decoding and display apparatus for digital television broadcasting.
Figure 2:
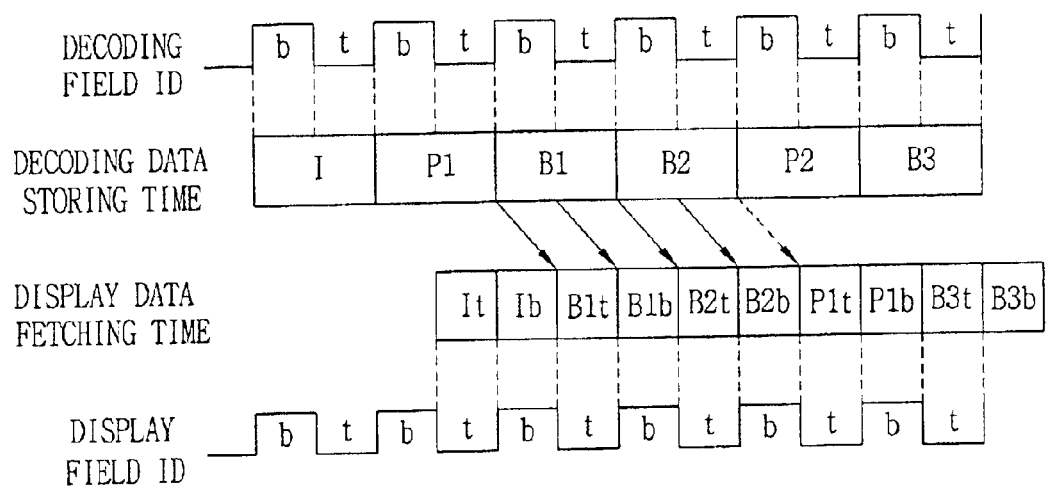
FIG. 2 is a timing chart for illustrating the decoding and display process when the size of a DTV window is same as the size of a whole screen.
Figure 3:
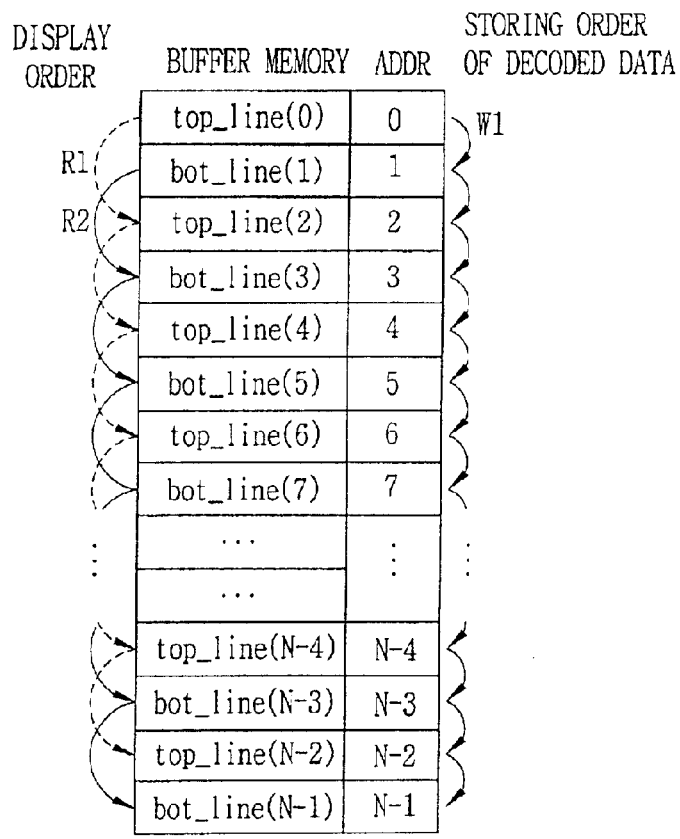
FIG. 3 is a memory map for a picture, and illustrating the order of storing and fetching scan line data.
Figure 4A:
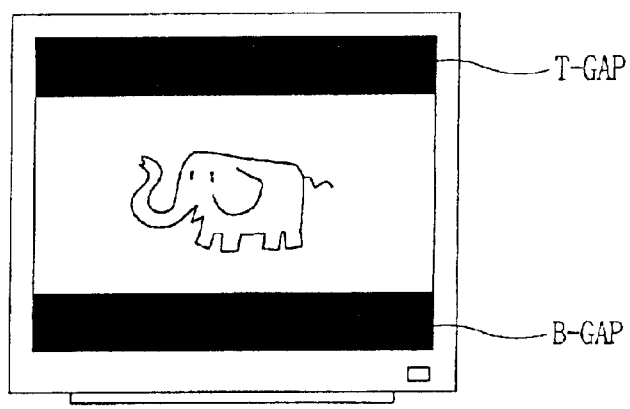
FIG. 4A illustrates the display of a resized video. Specifically it is a letter box mode of 16:9 pictures on a 4:3 monitor.
Figure 4B:
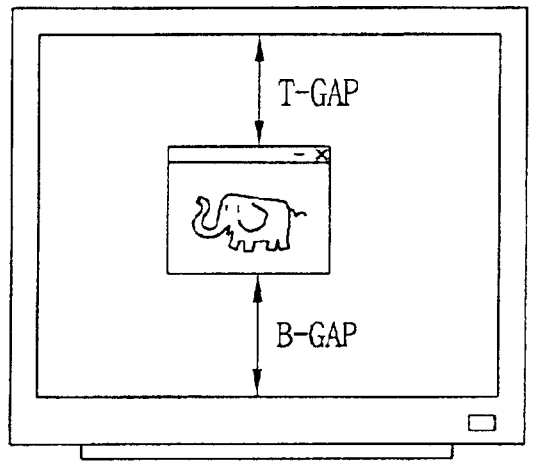
FIG. 4B illustrates the display of a resized video. Specifically it is a analog overlay mode on a PC monitor.
Figure 5A:
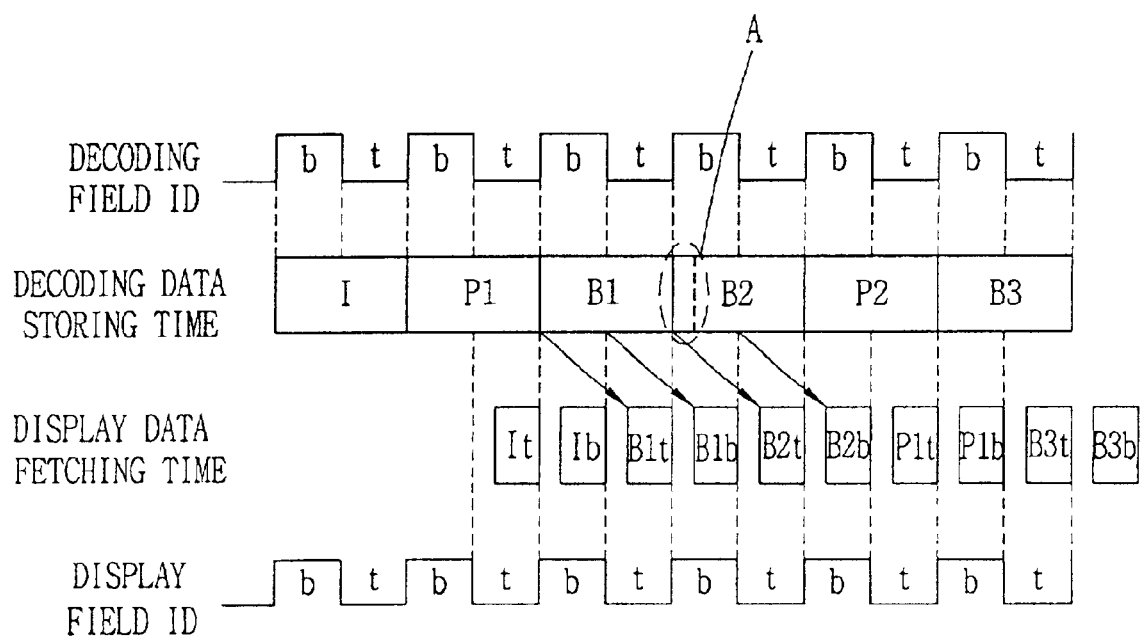
FIG. 5A is a timing chart illustrating the decoding and display process when the video is not displayed on the upper portion of the screen.
Figures 5B, 6A:
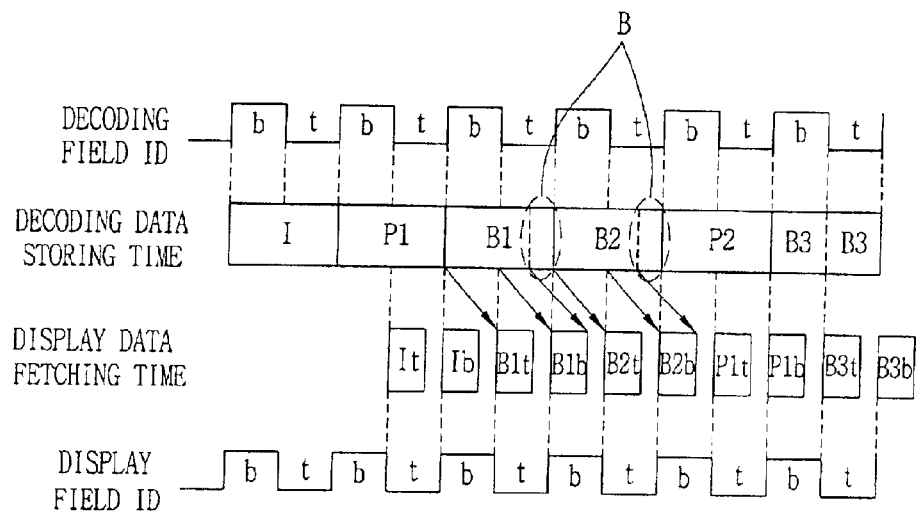
FIG. 5B is a timing chart illustrating the decoding and display process when the video is not displayed on the lower portion of the screen.
FIG. 6A is a memory map illustrating the first memory control mode of the present invention.

First, FIG. 6A is a memory map illustrating a first memory control mode of the present invention. The first half data of the first B frame (B1) is stored by skipping over one address (0, 2, 4, . . . , N−2) from the first address (0) in the order of W2.And the second half data of B1 is stored in the skipped addresses (1, 3, 5, . . . , N−1) in the order of W3.

In other words, the data is stored advance on the even addresses (2X, herein X=0, 1, 2, . . . ) W2, after that, the data is stored on the odd addresses (2X+1, herein X=0, 1, 2, . . . ) W3.

When the decoded data is stored by the first memory control mode, the top-field data (top_line(0)) is stored on the first address (0), the bottom_field data (bot_line(1)) is stored on the next address (2), and the top-field data (top_line(2)) is stored on the next address (4). Thus, two consecutive field lines, i.e., (top_line(0) and top line(2) or bot-line(1) and bot line(3) are located apart by four addresses.

To display the top field of B1, the picture data will be fetched in the order of R3 and R4. Similarly, the bottom field is fetched in the order of R5 and R6. Once the top field has been displayed, the memory for the top field becomes free. So, the decoded data of the second B picture (B2) can be stored in that memory even if the display of the bottom field of B1 has not started.

FIG. 6B is a memory map illustrating a second memory control mode of the present invention. The first half data of the second B frame (B2) is stored in the order of W4 at the addresses of 4x and 4X+1, herein X=0, 1, 2, . . . , which become vacant by the fetching processes of the top field data (R3 and R4), which has been stored at the first memory control mode.

The second half data of the second B frame (B2) are stored in the order of W5 at the addresses of 4X+2 and 4X+3, herein x=0, 1, 2, . . . , which become vacant by the fetching process of the bottom-field data, R5 and R6.

To display the B2 picture, the data is fetched in the order of R7 and R8 for the top field, R9 and R10 for the bottom field. Once the top field has been displayed, the third B picture can be stored with the first memory control mode.

Figure 7:
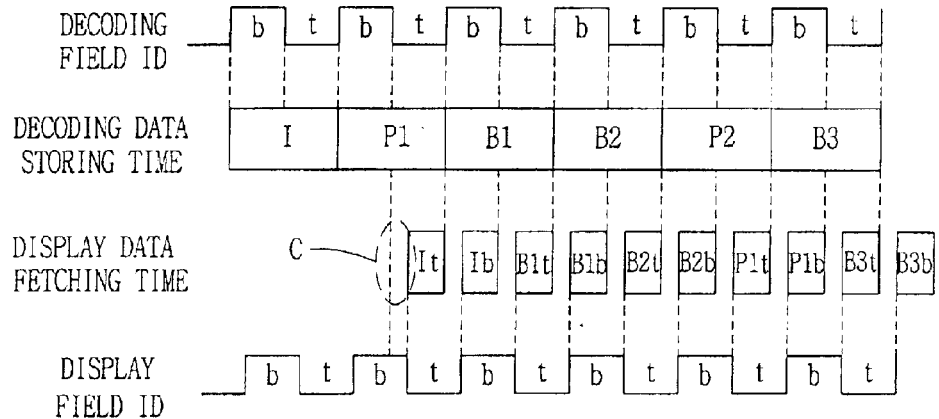
FIG. 7 is a timing chart illustrating the decoding and display process when the timing of the decoding field ID is adjusted.

FIG. 7 is a timing chart illustrating the decoding and display process when the video is not displayed on the lower portion of the screen, so the timing of the decoding field ID is adjusted.

By shifting the decoding field ID as time of "C", the storing completion timing of the data is coincided with the fetching completion timing. Thus, the loss of the decoding time can be compensated by starting the decoding process as early as B-gap.

Figure 8:
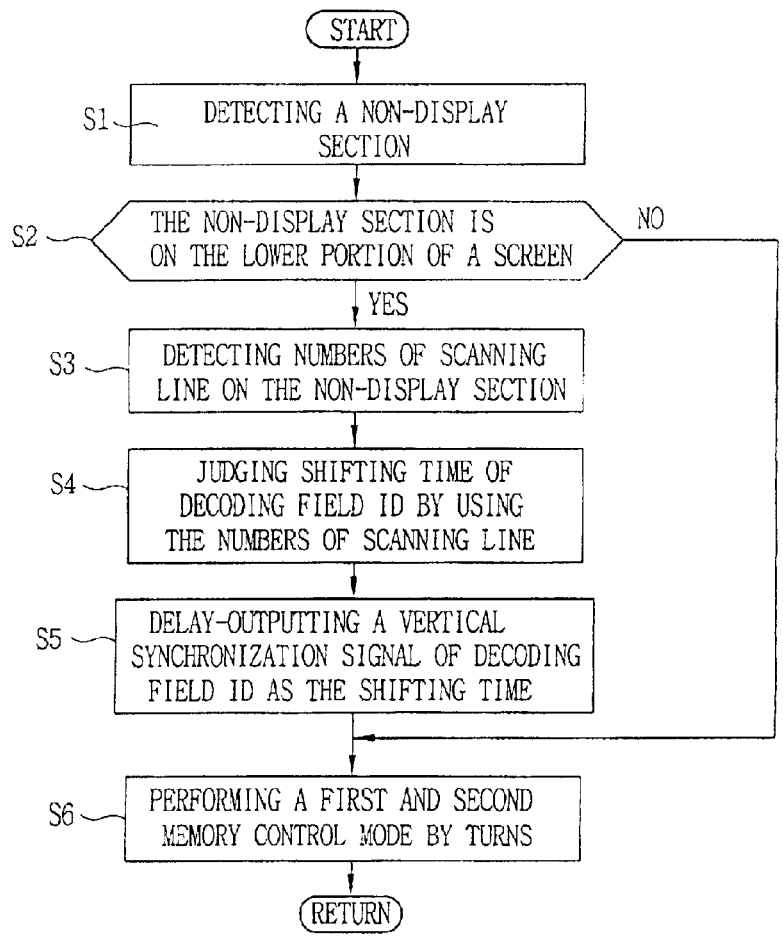
FIG. 8 is a flow chart illustrating how to apply the present invention to exploit entire decoding time.

FIG. 8 is a flow chart explaining steps for applying the present invention.

First, the non-display section is detected S1, and the section is judged whether it is lower portion of the screen S2.

Herein, when the data is stored and fetched by the first and second memory control mode as depicted in FIG. 6A and FIG. 6B, there is no need to detect and judge whether the non-display section is the upper portion.

According to this, when the videos are not displayed on the lower portion of the screen, the numbers of the scanning line on the non-display lower portion are detected S3.

After that, timing for shifting the edge timing of the decoding filed ID to the display completion timing is judged by multiplying the numbers of scanning line by the scanning time S4.

After that, the vertical synchronization signal of the decoding field ID is delayed-outputted as the shifting timing S5, and the edge time is adjusted to the display completion time.

Herein, the vertical synchronization signal of the decoding field ID for displaying on the screen in real, it is fixed as hardware-like, accordingly the vertical synchronization signal of the decoding filed ID is adjusted.

After that, when the edge timing adjustment of the decoding field ID is completed, the first and second memory control mode are performed by turns S6.

As described above, according to the present invention, decoded B picture data can be effectively stored. With two different storing schemes, the top and bottom field data can be stored and fetched independently. Thus, by applying two schemes by turns the decoding process does not have to wait for T-gap, even without an additional frame buffer.

As also described above, according to the present invention, the decoder can exploit entire decoding time even with B-gap. By shifting the decoding field ID ahead as much as B-gap, decoding process can be started as early as B-gap. So, the decoding time will not be reduced even if there is B-gap.

The foregoing embodiments and advantages are merely exemplary and are not to be construed as limiting the present invention. The teaching of the present invention can be readily applied to other types of apparatuses. The descriptions of the present invention are intended to be illustrative, and not to limit the scope of the claims. Various alternatives, modifications, and variations will be apparent to those skilled in the art.

What is claimed is:

1. A method for decoding and storing digital broadcasting signals, comprising:
    detecting a non-display section where broadcasting video is not displayed on a screen;
    judging whether the non-display section is on the lower portion of the screen;
    adjusting an edge timing to a display completion timing by shifting a decoding field ID as time as the non-display section when the videos are not displayed on the lower portion of the screen; and
    performing a first memory control mode and a second memory control mode by turns in order to prevent collisions between the fetching timing of the data to be displayed and the storing timing of the decoding data.

2. The method for decoding and storing digital broadcasting signals according to claim 1, wherein the shift timing of the decoding field ID can be calculated by detecting numbers of scanning line in the non-display section and multiplying it by the scanning time.

3. The method for decoding and storing digital broadcasting signals according to claim 2, wherein the size and position information of the broadcasting video window such as the numbers of scanning line can be gotten easily form an operating system of a PC.

4. The method for decoding and storing digital broadcasting signals according to claim 1, wherein the first memory control mode and the second memory control mode are performed by turns in regardless of the size of the section when the non-display section is on the upper portion.

5. The method for decoding and storing digital broadcasting signals according to claim 1, wherein, when the broadcasting video is not displayed on parts of the upper and lower portions of the screen, the method comprises:
    adjusting the edge timing to the display completion time by shifting the decoding field ID as the display time corresponding to the lower non-display portion; and
    performing the first and second memory control mode by turns.

6. The method for decoding and storing digital broadcasting signals according to claim 1, wherein the first memory control mode stores orderly the data decoded for the first half cycle of the decoding field ID on the even addresses (2X, herein X=0, 1, 2, . . . ), and stores orderly the data decoded for the next half cycle on the odd addresses (2X+1, herein X=0, 1, 2, . . . ).

7. The method for decoding and storing digital broadcasting signals according to claim 6, wherein the decoded data can be stored on the odd addresses (2X+1, herein x=0, 1, 2, . . . ) first, and later the even addresses (2X, herein X=0, 1, 2, . . . ).

8. The method for decoding and storing digital broadcasting signals according to claim 1, wherein the second memory control mode stores orderly the data decoded for the first half cycle of the decoding field ID on the addresses (4X, 4X+1, herein X=0, 1, 2, . . . ), and stores orderly the data decoded for the next half cycle on the addresses (4X+2, 4X-3, herein x=0, 1, 2, . . . ).

9. The method for decoding and storing digital broadcasting signals according to claim 1, wherein difference of four addresses occur on the each consecutive field data stored by the first and second memory control mode.

10. The method for decoding and storing digital broadcasting signals according to claim 1, wherein the top field data fetches the data on the addresses (4X, herein x=0, 1, 2, . . . ), and orderly fetches and displays the data on the addresses (4X+1, herein X=0, 1, 2, . . . ) when the data stored by the first memory control mode are displayed.

11. The method for decoding and storing digital broadcasting signals according to claim 1, wherein the bottom field data fetches the data on the address (4X+2, herein X=0, 1, 2, . . . ) first, and orderly fetches and displays the data on the addresses (4X+3, herein X=0, 1, 2, . . . ) when the data stored by the first memory control mode are displayed.

12. The method for decoding and storing digital broadcasting signals according to claim 1, wherein the top field data fetches the data on the addresses (4X, herein x=0, 1, 2, . . . ), and orderly fetches and displays the data on the addresses (4X+2, herein X=0, 1, 2, . . . ) when the data stored by the second memory control mode are displayed.

13. The method for decoding and storing digital broadcasting signals according to claim 1, wherein the bottom field data fetches the data on the address (4X+1, herein X=0, 1, 2, . . . ) first, and orderly fetches and displays the data on the addresses (4X+3, herein X=0, 1, 2, . . . ) when the data stored by the second memory control mode are displayed.

14. The method for decoding and storing digital broadcasting signals according to claim 1, wherein the decoding data is the B-frame data.

15. The method for decoding and storing digital broadcasting signals according to claim 14, wherein the process for storing or fetching the B-frame data is performed through the one buffer memory.

* * * * *